March 8, 1960 E. LEVINSON ET AL 2,928,035

FEEDBACK SERVO SYSTEMS

Filed Oct. 30, 1957 2 Sheets-Sheet 1

INVENTORS
EMANUEL LEVINSON
JOSEPH C. THOM
BY R. J. Craddock
ATTORNEY

FEEDBACK SERVO SYSTEMS

Filed Oct. 30, 1957 2 Sheets-Sheet 2

INVENTORS
EMANUEL LEVINSON
JOSEPH C. THOM
BY
ATTORNEY

United States Patent Office
2,928,035
Patented Mar. 8, 1960

2,928,035

FEEDBACK SERVO SYSTEMS

Emanuel Levinson, Jericho, N.Y., and Joseph C. Thom, Sunnyvale, Calif., assignors to Sperry Rand Corporation, a corporation of Delaware Application October 30, 1957, Serial No. 693,310
5 Claims. (Cl. 318—448)

The present invention relates generally to apparatus for use in the stabilization of control systems and more particularly to apparatus for the stabilization of feedback control systems. The invention, in other of its aspects relates to non-linear electrical compensating circuits having predetermined and unique gain-phase relationships which may be applicable to systems other than feedback control systems.

More specifically, the present invention is concerned with the application of non-linear networks to the stabilization of servo systems, which networks possess the unique characteristic of supplying an output the gain of which decreases with the frequency of the system error signal without changing the phase of such system error signal; in other words, a circuit which provides gain reduction with frequency increase without phase change. Such characteristics are not present in linear circuits since in the latter gain reduction with frequency increase is generally accompanied with a phase lag. However, with the non-linear circuits of our invention, any desired gain and phase performance with frequency can be achieved by the tandem combination thereof with conventional linear circuits, including phase lead without gain change and even phase lead with gain reduction. Such circuits are desirable as compensating circuits in the stabilization of feedback control systems. Throughout the present specification, the "gain" and "phase" under consideration are that of the "describing function," i.e., the fundamental frequency response of the servomotor loop.

In the stabilization of feedback control systems, many shaping, compensating or equalization circuits have been devised to avoid encirclement by the open-loop frequency locus of the $-1,0$ critical point in the Nyquist stability plot. In general, such encirclement can be avoided by providing either one or both of two types of frequency responses: (1) a reduction of gain with increasing frequency, and/or (2) a phase lead with increasing frequency. It can be shown that with most linear, minimum phase or linear non-minimum phase networks, gain reduction with increasing frequency is generally accompanied with a phase lag while phase lead with increasing frequency is generally accompanied with an increasing gain. Such linear circuits, when employed in feedback control systems have inherent destabilizing effects even though in spite of these effects, their gain-phase relationships can be compromised to provide some degree of stability improvement.

The non-linear circuits of the present invention, on the other hand, are free of these destabilizing effects since they posses the property of gain reduction with frequency without phase change and therefore completely satisfy frequency-response criteria (1) above or when combined with the usual linear circuits can completely satisfy the frequency response criteria (2) above or both. Indeed with such combination of non-linear and linear circuits, any conceivable gain-phase performance with frequency may be achieved.

It is therefore a primary object of our invention to provide novel non-linear compensating or equalization networks for use in the stabilization of servo systems.

It is a further object of our invention to provide novel stabilization circuits for use in servo systems which exhibit the property of gain reduction with frequency without effecting the phase of the error signal controlling the system, such circuits being so incorporated in the system that as the frequency of the system error increases the system gain is reduced to thereby decrease the tendency of the system to become unstable or oscillatory at critical frequencies.

It is still a further object of the invention to provide a feedback servo system having a variable gain control device in the forward loop of the system and responsive to a system error signal and wherein as the frequency of the system error increases and the system tends to become unstable, the gain of the variable gain device is correspondingly decreased.

It is still a further object of our invention to provide a feedback servo system wherein the gain of the system is decreased with an increase in the frequency of the error signal controlling the system with an accompanying phase lead in the error signal controlling the system.

Other objects and advantages of our invention will become clearly apparent as the description of preferred embodiments thereof proceeds, reference being made to the accompanying drawings wherein.

Figure 1:
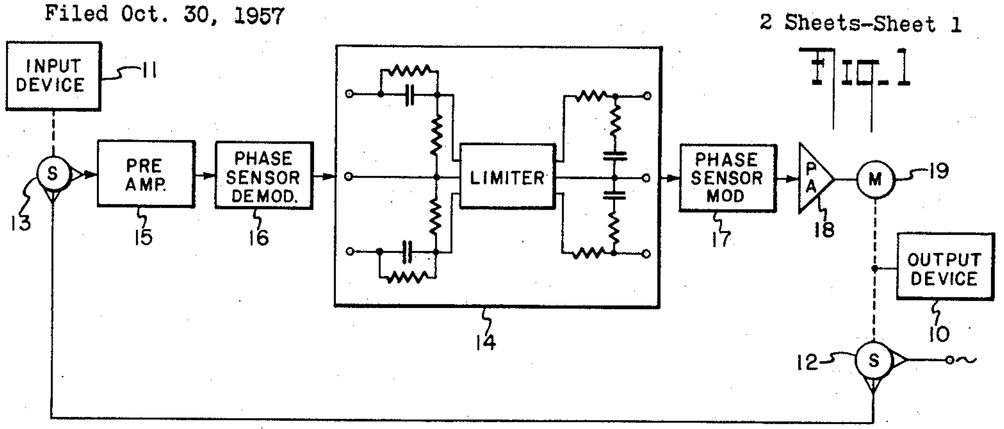
Fig. 1 is a schematic diagram of a feedback servo system embodying a stabilization circuit constructed in accordance with the teachings of our invention.

In Fig. 1 we have schematically illustrated a generally conventional feedback or closed loop servo system comprising an output device 10, the operation of which is to be controlled in accordance with the operation of an input device 11. As in a conventional feedback servo system, the output device is controlled in accordance with a signal which is a measure of the difference between the operation of the output device with respect to the operation of the input device, such signal being termed herein as the system error signal or a control signal varying in accordance with the system error. For this purpose we have provided a signal transmitter device which may be, for example, a synchro transmitter 12 having its rotor connected to be positioned by the output device 10, and energized by a 400 cycle carrier voltage. The stator, which in the embodiment illustrated comprises a three phase winding, is connected to a correspondingly wound stator of a receiver device or synchro control transformer 13, the rotor of which is positioned by input device 11. With this feedback connection between the output and input devices, any difference between the operation of the output device 10 with respect to the operation of the input device 11 will produce in the rotor winding of control transformer 13 a 400 cycle signal which is modulated in accordance with such operational difference. The output of synchro 13 therefore constitutes the system control signal or a signal representative of the system error, the magnitude of which represents the magnitude of the error and the phase of which represents the direction or sense of said error. The error signal from synchro 13 is ultimately applied to a power amplifier 18 which controls the operation of a servo motor 19 connected to drive the output device 10 and synchro 12, the latter circuit constituting the forward path of the servo system.

It is well known that a linear servo system such as that so far described may become unstable and oscillatory at certain critical frequencies of the error signal unless some form of stabilization device and/or equalization circuits are employed. Many forms of stabilization techniques have been employed to avoid instability, such as various types of damping (as viscous damping and electrical velocity feedback damping) and the use of time derivative networks and other wave shaping and/or compensation networks. While various types of shaping networks have been employed to avoid encirclement of the −1,0 critical point by the open loop frequency locus and thereby provide some improvement in the stabilization of an otherwise unstable system such as can be obtained by inserting linear, minimum-phase shaping networks in the forward path of the servo loop, such linear networks inherently produce shifts in the phase of the system control signal or undesired gain changes, both of which have destabilizing effects. The non-linear circuits of the present invention are free of the destabilizing effects of conventional linear networks in that they are free of the gain-phase restraints imposed by such linear networks.

Returning now to Fig. 1 and assuming for discussion purposes an oscillatory condition between the output members 10 and the input member 11, such as may be produced by a uniformly varying operation of the input device, or by other cause, the system error signal from control transformer 13 will be a 400 cycle A.-C. voltage which is modulated by the operation of the output and input devices and such modulation will vary in frequency in accordance with such oscillation. Furthermore, if the gain-phase relationship of any two signals operating in the system is such that there is a finite gain in the forward loop while the relative phase of the two signals is substantially 180° apart, for example the output lags that of the input by substantially 180°, an oscillatory condition also will result. It is of course desired to prevent such unstable or oscillatory conditions from occurring and the stabilization circuits of our invention will accomplish this result.

As stated above, any circuit or network which is capable of producing a gain reduction with frequency at the frequency at which the system tends to become unstable without changing the phase of the system error signal can be employed to stabilize an otherwise oscillatory or unstable system. In Fig. 1 the network represented within the rectangle 14 possesses this gain reduction with frequency characteristic. The system error signal from synchro transmitter 13 is amplified in suitable preamplifier 15 of conventional construction the output of which is passed through a phase-sensitive demodulator 16 to remove the 400 cycle carrier and produce in its output a D.-C. voltage which varies in magnitude and frequency with the modulation signal generated by the relative rotor operations of transmitter 12 and receiver 13. Considering the frequency component of the system error signal, the output of the demodulator 16 is applied to a network 14 the fundamental gain of which remains substantially constant for frequencies below a predetermined value but which thereafter decreases for frequencies greater than that predetermined value without effecting the phase of the system error signal, as will be described. The output of the network 14 is applied to a phase-sensitive modulator 17 which modulates a 400 cycle carrier such that it may be amplified in the power amplifier 18. A servo motor controlled by the output of amplifier 18 controls the operation of the output device 10. Thus, for those frequencies of the system error signal wherein the output device 10 can follow the operation of the input device 11 without lagging the input device 11 by considerably less than 180°, the gain of the system need not be altered from its normal gain value and the system will be stable. However, for frequencies wherein the lag in the operation of the device 10 with respect to the input device 11 approaches 180°, the gain is accordingly reduced to decrease the tendency of the system to become unstable. In designing the system it is therefore desirable to have the gain of the system approach a unity value considerably prior to the −180° phase lag point.

Figure 2:
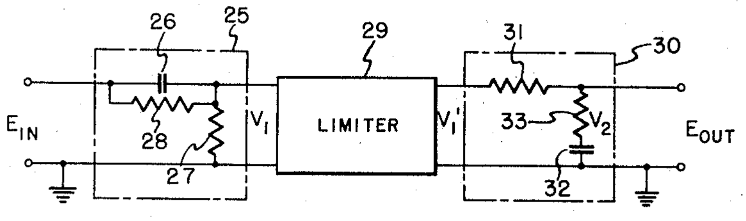
Fig. 2 is a wiring diagram of the stabilization circuit employed in the system of Fig. 1.
Figure 3:
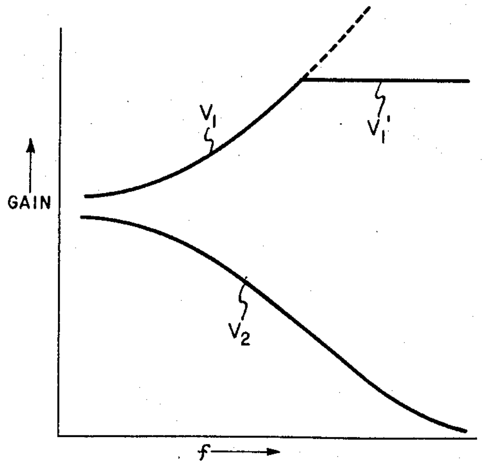
Figs. 3 and 4 are graphs useful in explaining the operation of the circuit of Fig. 2.

Fig. 2 illustrates a simplified or half-wave version of the compensating network 14 of Fig. 1, and any non-linear circuit or network of this type will exhibit the desired gain reduction with frequency without phase change characteristic. In general the network 14 comprises a first circuit 25 which is a high-pass network, that is, a network which exhibits an increase in gain with frequency and a corresponding phase advance with respect to the phase of the input signal applied thereto. This high-pass or lead network includes series connected capacitor 26 and resistor 27. A resistor 28 connected in parallel with condenser 26 is provided for shunting capacitor 26 so that signals of substantially zero frequency may be passed through the network 25. Assuming a constant magnitude, variable frequency input signal, the output appearing across resistor 27 is represented by the fundamental frequency response curve $V_1$ in the graph of Fig. 3. It will be observed that the gain through the network 25 increases in accordance with the signal input frequency applied thereto. The output $V_1$ of network 25 is applied to a voltage limiter 29 of conventional construction which serves to limit the gain increase produced through network 25 ($V_1'$ portion of curve $V_1$). The value at which the voltage limiter 29 operates is determined by the critical frequency at which it is desired to begin to reduce the gain of the system, as will become evident as the description proceeds. The output of limiter 29 is impressed upon a low pass network 30 which comprises series connected resistor 31 and condenser 32. This circuit exhibits a decrease in gain with a frequency increase of the input signal applied thereto and its output voltage is represented by the frequency response curve $V_2$ of Fig. 3. Resistor 33 is included in the low-pass network for compensating for the effects of the by-pass resistor 28 in network 25. The components of high-pass network 25 and low-pass network 30 are so selected, constructed and arranged that, insofar as their gain-phase characteristics are concerned, they are substantially mirror images. That is, the gain increase produced by network 25 is the same as the gain decrease produced by network circuit 30 and likewise the phase lead through network 25 is substantially equal to the phase lag through network 30. By this arrangement of circuit elements, the relative gain of the two circuits mutually cancel up to the point at which the limiter functions. Thereafter, the gain through high-pass network 25 and limiter 29 remains constant while the gain through the low-pass network 30 continues to decrease, their phase-relations continuing to be equal and opposite so that there is no phase change in the output with respect to the input. Since the circuits are connected in series, the net gain of the output will decrease after operation of the limiter. Thus the circuit 14 may be described as a non-linear circuit.

Figure 4:
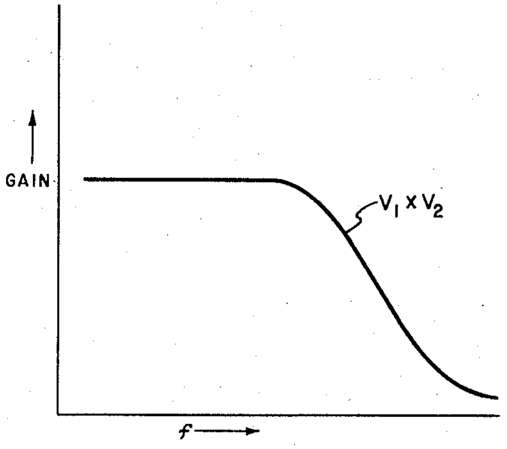

Having thus designed the networks 25 and 30 to have substantially equal and opposite gain-phase characteristics, the output of the entire compensating network 14 will remain substantially constant up to a predetermined frequency value and then will decrease for further increases in the frequency of the system error signal. This output is represented graphically in Fig. 4 which shows the combined effect of the curves $V_1$ and $V_2$ of Fig. 3. Gain reduction with increased frequency without a phase change occurring in the system error signal is observed to occur. Another circuit of the type shown in Fig. 2 which exhibits the above characteristics is a differentiating circuit-limiter-integrating circuit.

Figure 5:
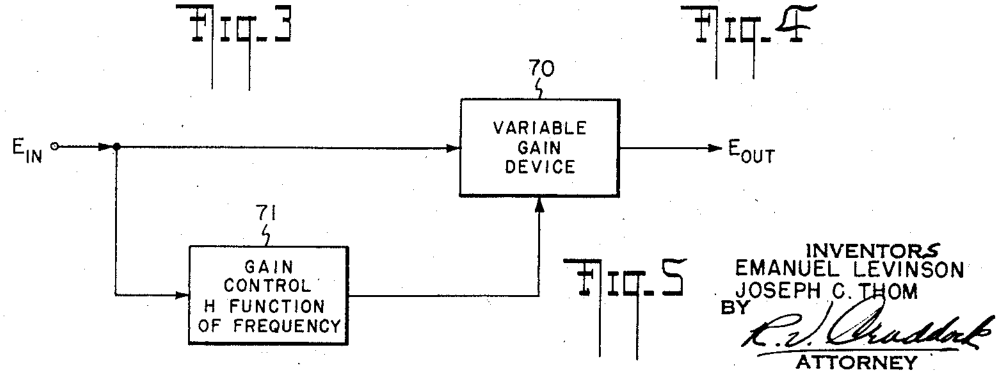
Fig. 5 is a block diagram of another form of stabilization circuit constructed in accordance with the teachings of our invention.

In Fig. 5 there is illustrated another form of compensation circuit which exemplifies the teachings of our invention. In this circuit the input or error signal is supplied to the controlled device through a variable gain amplifier 70 which may be called a non-linear device. The error signal is also supplied to a branch circuit wherein a frequency responsive circuit 71 responsive thereto, provides an output, the gain which varies as a function of frequency, and this branch circuit output is supplied to the variable gain amplifier 70 for controlling the gain thereof in accordance with such output. Thus, if the frequency responsive circuit 71 exhibits an increase in gain with an increase in frequency, and its output functions to decrease the gain of the variable gain amplifier 70, the gain through the forward path of the servo loop will be decreased as the frequency of the error signal increases, and this will be accomplished without changing the phase of the original error signal. In short, the circuit of Fig. 5 exhibits the desired gain reduction with frequency without phase change.

Figure 6:
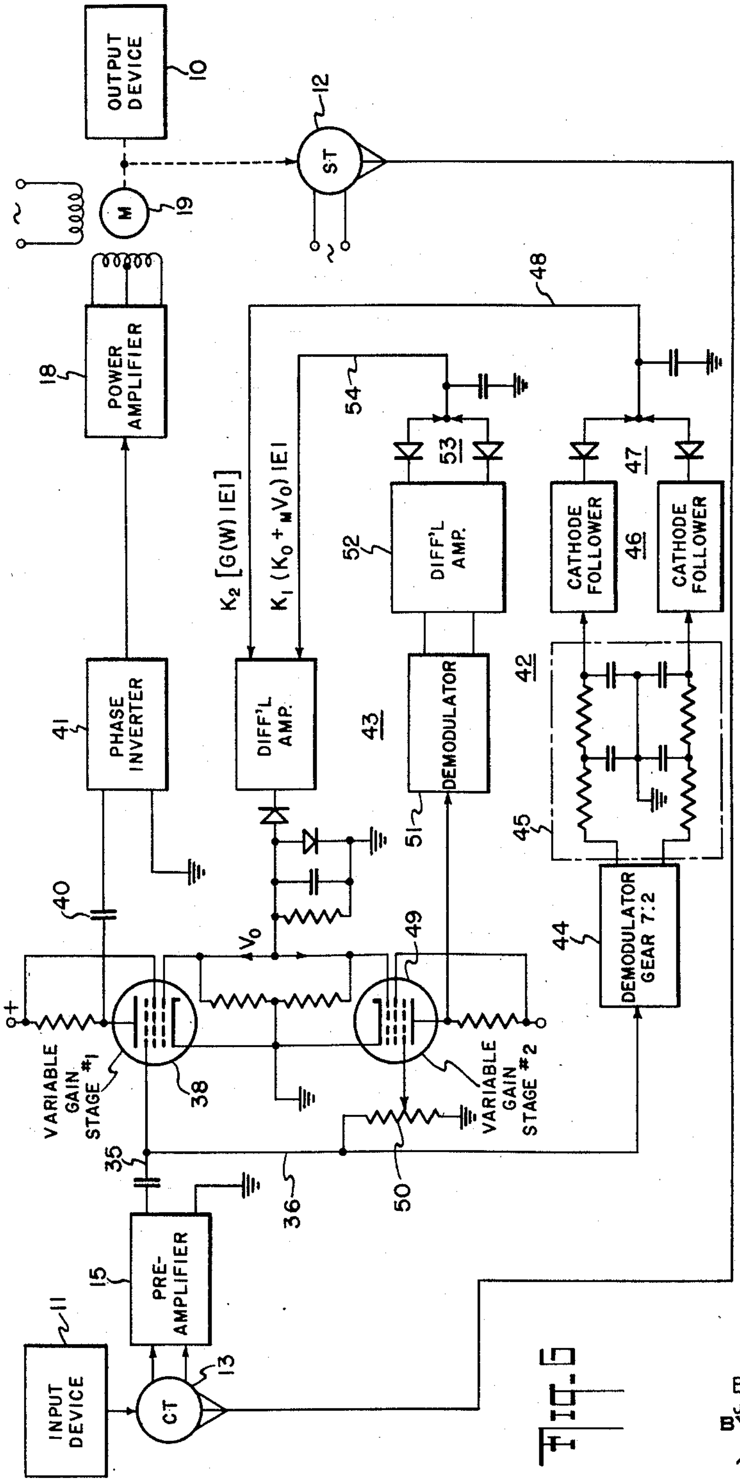
Fig. 6 is a schematic diagram of a feedback servo system of the form shown generally in Fig. 5.

The circuits of Figs. 1, 2 and 5 are illustrative of the basic principles of our invention. However, it will be noted that these circuits are also responsive to the magnitude of the input or error signals. In Fig. 6 there is illustrated an exemplary circuit which provides the desired fundamental frequency response gain-phase characteristic while at the same time is rendered independent of the magnitude of the input signal for a wide range of input values. In the circuit of Fig. 6, gain reduction with frequency without phase change is accomplished, as in the scheme of Fig. 5, because the frequency sensing and control circuits are associated in a branch circuit and therefore have no effect on the phase of the system error signal since this signal is controlled only by the gain of the variable gain amplifier which introduces no phase change (accept of course for the normal 180° sign change associated with any amplifier tube).

In Fig. 6, the same reference characters are applied to corresponding elements shown in Fig. 1. As in Fig. 1, the output of control transformer 13 of Fig. 6 is initially amplified in pre-amplifier 15 and impressed upon a variable gain amplifier tube 38. The output of tube 38 is taken from the plate thereof and applied through coupling condenser 40 to a phase inverter 41 whose output in turn is applied to power amplifier 18 controlling the servomotor 19 and the output device 10, the circuit just described constituting the forward path of the servo system. The system error signal of Fig. 5 is generated as in Fig. 1 by means of coupled synchro transmitter 12 and control transformer 13 which signal varies in phase, magnitude, and frequency in accordance with the difference in the operation of the output device 10 and input device 11.

Several techniques may be employed for providing gain reduction without phase change which is independent of the input magnitude of the system error signal, at least for a practical range of input signal magnitudes. For example, one technique may involve the use of a limiter circuit arranged to generate a fixed magnitude signal at the input frequency for a desired range of input signal magnitudes. The general technique employed in the preferred embodiment of our invention illustrated in Fig. 6 makes use of a divider circuit in which the input signal magnitude multiplied by a frequency dependent function thereof is divided by the input signal magnitude thereby rendering the frequency dependent function independent of signal magnitude. Of course this divider technique is only valid down to some small magnitude of input signal because obviously division by a very small number is impractical. However, since there is generally some small "stiction" level of error signal magnitude in most servo systems it is of not too great concern if independence of magnitude below this "stiction" level is not obtained.

The general divider technique may also take various forms. For example, a servo responsive to the absolute magnitude of the input signal may be used to vary the feed-back around a high-gain amplifier responsive to the product of input magnitude and frequency. In a similar manner, a variable gain amplifier responsive to the product of input frequency and magnitude may have its gain varied in accordance with input magnitude only, thereby producing in the output of the variable gain amplifier a signal which is dependent only upon the frequency component of the system error signal.

The technique employed in the circuit of Fig. 6 is actually a combination of the latter two techniques mentioned above. In this technique a division circuit of a type described on page 674 of vol. 19 of the MIT Radiation Laboratories Series, McGraw-Hill, New York, 1949, is employed, which circuit is all electronic and does not depend on critical circuit parameters.

The compensation circuit of Fig. 6 may be divided into two channels; a frequency control channel 42 and a magnitude control channel 43, both connected to receive the system error signal appearing on lead 35 and branch lead 36. The frequency control channel 42 actually provides an output the gain of which is a function of the product of the frequency G(W) of the system error signal and the absolute magnitude |E| of such error, while the magnitude control channel 43 provides an output which is a function of the absolute magnitude |E| of the system error signal for predetermined practical magnitudes. The frequency control channel 42 comprises generally a phase sensitive demodulator 44, a full-wave, two-stage, low-pass network 45, a cathode follower stage 46 for isolation, and a rectifier stage 47, and supplies in its output lead 48 a D.-C. signal voltage the magnitude of which is proportional to the product of the gain of circuit 45, responsive to the frequency of the system error signal, and the absolute magnitude of such error signal. The capacitor across the frequency control signal lead 48 makes this signal distortion free at very low frequencies and does not effect the gain characteristics of the signal. Mathematically, this D.-C. control signal may be represented by the expression $K_2[G(W)\cdot|E|]$ where G(W) is the gain component responsive to the frequency of the error signal, E the gain component responsive to the magnitude of the error signal, and $K_2$ the gain constant of the demodulator 44. The magnitude control circuit 43 comprises generally an attenuator or voltage divider 50 and a variable gain amplifier stage 49 responsive to the system error signal on lead 36, a phase sensitive demodulator 51, differential amplifier 52, and a rectifier stage 53. If the gain of variable gain amplifier 49 is assumed to be represented by the expression $(K_0+mV_0)$, the output of the circuit 43 is arranged to supply a D.-C. control signal on lead 54 the magnitude of which is proportional to the product of the absolute magnitude |E| of the system error signal times the gain of the variable gain amplifier $(K_0+mV_0)$, times a lumped gain constant $K_1$ representing gain effects of the attenuator 50, demodulator 51, and differential amplifier 52. The expression for the circuit 43 is $K_1[(K_0+mV_0)|E|]$. The D.-C. signals on leads 48 and 54 are supplied to a differential amplifier 55 where they are subtracted and amplified, the output of amplifier 55 being connected in feedback fashion to control the gain of variable gain stage 49. The same signal also controls the gain of the variable gain stage 38 in the forward path of the servo system. The operation of the compensation circuit of Fig. 5 may be best understood by considering the mathematical expressions represented by the circuit. Mathematically, the D.-C. frequency control signal controlling the variable gain stages 38 and 49 may be represented by the following expression.

$$V_0=A[-K_1(K_0+mV_0)|E|+G(W)K_2|E|] \quad (1)$$

where A is the gain of the differential amplifier 55. This equation can be reduced to $$V_0=\frac{\frac{-K_0}{m}\left[1-\frac{|G(W)|K^2}{K_1K_0}\right]}{1+\frac{1}{AK_1m|E|}} \quad (2)$$

If $K_2$ is made equal to $K_1 \cdot K_0$ then it follows that $$V_0=\frac{\frac{-K_0}{m}[1-|G(W)|]}{1+\frac{1}{AK_1m|E|}} \quad (3)$$

The output over input transfer for the variable gain amplifier 38 may therefore be expressed as $$\frac{E_0}{E_{in}}=(K_0+mV_0)=K_0-\frac{K_0(1-|G(W)|)}{1+\frac{1}{AK_1m|E|}} \quad (4)$$

and for all input magnitudes where $$AK_2m|E|>>1$$

$$\frac{E_0}{E_{in}}\cong K_0|G(W)| \quad (5)$$

which transfer is seen to be independent of the magnitude |E| of the system error signal. Since G(W) is the frequency component of the output of low pass network 45, its value decreases as the frequency of the system error signal increases. Also since the gain of variable gain amplifier 38 is controlled in accordance with G(W), it is seen that the gain of the system is reduced as the system frequency is increased and such gain reduction is independent of error signal magnitude and is accomplished without shifting or changing the phase of the system error signal supplied to the servomotor 19 through amplifiers 38 and 18. The reactifier circuit across the $V_0$ control signal functions to keep the control signal negative or at most slightly positive.

It will be noted that the gain control signal $V_0$ is applied to the grid of each of the stages 38 and 49 and that the system error signal is applied to the suppressor grid of each stage. With such connection each of the amplifier stages are rendered more sensitive to the gain control signal $V_0$.

Furthermore, the circuit of Fig. 6 simplifies the stabilization problem since the circuit is not sensitive to carrier frequency changes and any drift effects act only as a gain change and not as an unbalance which might lead to system error.

Figure 7:
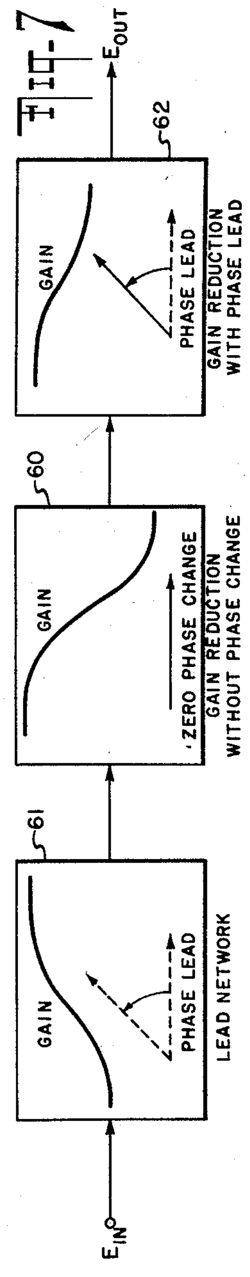
Fig. 7 is a block diagram of a gain-phase correction network embodying our invention which can be inserted in the forward loop of a feedback servo system of the type shown in either Fig. 1 or Fig. 5.

Thus, we have illustrated two exemplary circuits which accomplish the function of reducing the gain of a servo system as a function of increased frequency without altering or affecting the phase of the error signal controlling the system. Having thus established circuits which provide gain reduction with frequency without phase change, these circuits may be combined with conventional linear circuits to thereby produce substantially any gain-phase relationship desired. An example of such combination is illustrated schematically in Fig. 7. In this figure, a circuit which may be either one of the types described above is represented by the block 60 which possess the gain-phase characteristic with frequency represented by the "gain" curve and "phase" vector illustrated within this block (a horizontally disposed vector extending to the right representing zero phase). This circuit provides gain reduction with frequency without phase change. The block 61 represents a conventional linear lead network such as that shown at 25 in Fig. 2, which network possesses the gain vs. frequency characteristic illustrated by the "gain" curve within the block. As illustrated by this curve, the lead network possesses an increasing gain with frequency characteristic. Below this curve is illustrated a phase vector angularly rotated in a counterclockwise direction to illustrate the phase lead normally associated with such a linear lead network. Now, if these two circuits are connected in series and the gain reduction of the circuit 60 is made equal to the gain increase produced by the lead network by adjusting the circuit parameters within the blocks 61 and 60, phase lead with frequency without the gain change will result. Furthermore, if the gain reduction of the circuit 60 is made greater than the gain increase of the circuit 61 it is seen that the resultant or output signal possesses the characteristic of gain reduction with phase lead. The latter output is illustrated by the curves of block 62. It should be noted that any circuit within the block 61 must be capable of passing a zero frequency signal. This may be accomplished as in the lead circuit 25 of Fig. 2 wherein a bypass resistor 28 around the capacitor 26 is provided.

By the above invention, we have demonstrated that non-linear circuits may be devised which exhibit the property of gain reduction with frequency without phase change, which circuits can be employed to stabilize an otherwise unstable servo system and it should be emphasized that the specific circuits illustrated are only exemplary of a great many circuits which could be constructed which will exhibit such phenomenon. For example, a thermally controlled resistor could be placed in shunt with an input control signal, and wherein the frequency of the input signal is detected and passed through a branch circuit exhibiting the desired gain reduction-with-frequency response, and its output employed to vary the temperature of the resistance in a sense to increase the conductivity of the resistor with an increase of input signal frequency to thereby reduce the gain through the error signal circuit as a function of the frequency of the error signal without changing the phase thereof.

Since many changes could be made in the above construction and many apparently widely different circuits could be devised without departing from the true scope and spirit of the invention in its broader sense, it is intended that all matter contained in the above description, or shown in the accompanying drawings, shall be interpreted as illustrative rather than limitative.

What is claimed is:

1. A feedback servo system comprising, means for producing an error signal varying in magnitude and frequency in accordance with the difference in operation between an input member and an output member, means for controlling the gain of said system, means responsive to the output of said gain control means for controlling said output member in a sense to produce substantially synchronous operation of said members, means connected to receive said error signal for producing a control signal varying in accordance with the frequency of said error signal, and means for controlling said gain control means in accordance with said control signal.

2. A servo system comprising an input device, an output device, and signal generator means coupled therebetween for producing an error signal dependent upon the difference between the operation of said output device with respect to the operation of said input device, said error signal varying in frequency in accordance with said difference, a variable gain amplifier having its input connected to receive said error signal and its output connected to control said output device, means connected to receive said error signal for detecting the frequency thereof and for supplying an output signal the magnitude of which varies in accordance with said detected frequency, and means for controlling the gain of said amplifier in accordance with said output signal, the sense of said control being such that as the frequency of said error signal increases the gain of said amplifier is decreased.

3. A circuit for use in controlling the frequency response of a closed loop servo system comprising a first network responsive to the frequency of a system error signal for producing a first output the magnitude of which increases with increasing frequency of said error signal and the phase of which leads the phase of said error signal, a limiter circuit connected to receive said first output for limiting the magnitude thereof to a predetermined value, and a second network connected to receive the output of said limiter for producing a second output which decreases with increasing frequency of said error signal and the phase of which lags the phase of said error signal, the time constants of said first and second networks being such that their relative gain and phase relations are substantially equal and opposite whereby the net output of said circuit is substantially constant in magnitude and phase up to said predetermined limit but thereafter the magnitude thereof decreases with the frequency of said error signal while the phase thereof remains constant.

4. A feedback servo system for controlling the operation of an output member in accordance with the operation of an input member comprising means for providing a control signal varying in magnitude and frequency in accordance with the difference between the operation of the input and output members, variable gain control means responsive to said control signal for controlling the operation of said output member in a sense to reduce said control signal toward zero, means connected to receive said control signal for supplying an output signal the magnitude of which is independent of the magnitude of said control signal and varies only in accordance with frequency thereof, and means for controlling the gain of said control means in accordance with said output signal in a sense such that said gain is reduced with increasing frequency of said control signal.

5. A control circuit adapted for use in a feedback servo system controlled in accordance with a system error signal, the frequency of said error signal varying in accordance with the difference in operation between input and output members of said system, a first linear network for producing an output signal the magnitude and phase of which vary in accordance with the frequency of an input signal supplied thereto, a second, non-linear network for producing an output signal the magnitude only of which varies in accordance with the frequency of an input signal supplied thereto, means for connecting said first and second networks in cascade with said system error signal whereby to produce a resultant output of said control circuit the magnitude of which varies in accordance with the combined effects of said first and second networks while the phase thereof varies only in accordance with the phase effect of said first circuit.

References Cited in the file of this patent

UNITED STATES PATENTS

| | | |
|---|---|---|
| 2,607,851 | Pfleger | Aug. 19, 1952 |
| 2,632,872 | Warsher | Mar. 24, 1953 |

OTHER REFERENCES

Radio Engineers Handbook, Terman, first edition, McGraw-Hill, New York, 1943, p. 244.